Jan. 4, 1944.  E. C. ARMSTRONG ET AL  2,338,615
MIXING DEVICE
Filed March 22, 1941  2 Sheets-Sheet 1
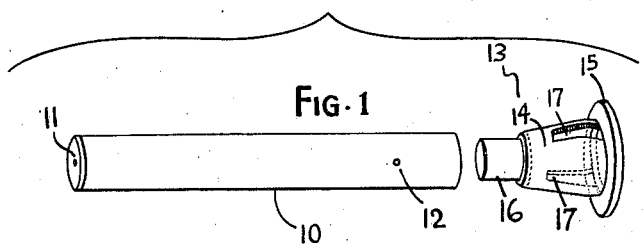
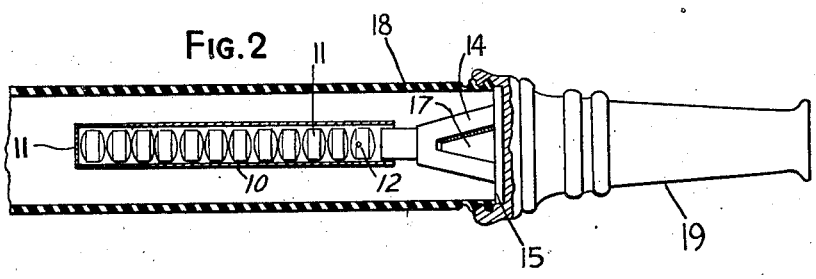
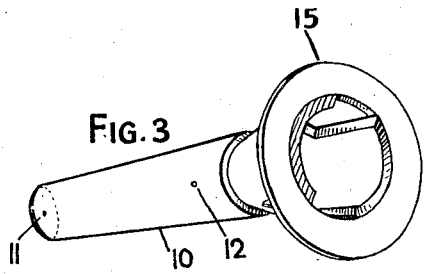 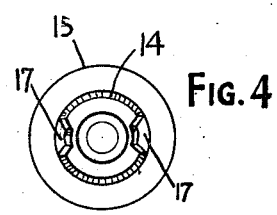
INVENTORS
Eugene C. Armstrong
Robert R. Lokey Jr.
BY
ATTORNEY.

Jan. 4, 1944.  E. C. ARMSTRONG ET AL  2,338,615
MIXING DEVICE
Filed March 22, 1941  2 Sheets-Sheet 2
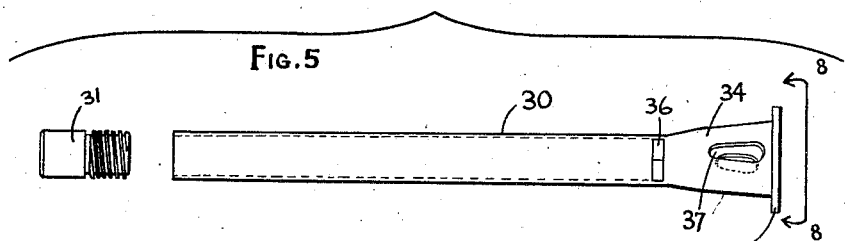
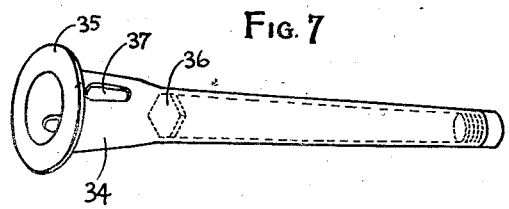
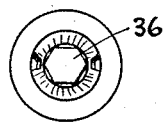
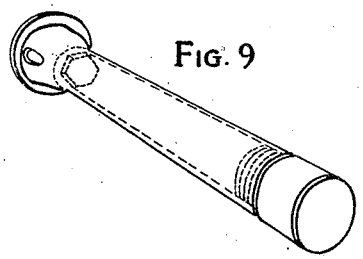
INVENTORS
Eugene C. Armstrong
Robert R. Lokey Jr.
BY
Robert W. Fulwider
ATTORNEY.

Patented Jan. 4, 1944

2,338,615

UNITED STATES PATENT OFFICE 2,338,615

MIXING DEVICE

Eugene C. Armstrong and Robert R. Lokey, Jr., Los Angeles, Calif.

Application March 22, 1941, Serial No. 384,624

10 Claims. (Cl. 299—83)

Our invention relates generally to mixing devices and more particularly to a means for dissolving a predetermined amount of solid material, such for example as a vitamin concentrate, in a given quantity of water for application to plants.

Heretofore it has generally been the practice to dissolve the vitamin or other substance in a container of water and then to apply the solution to the plants to be treated. In some instances, devices have been developed for mixing the material in the stream of water carried to the plants by a hose or pipe, but such devices have always been unduly complicated or extremely inaccurate.

It is consequently the major object of our invention to provide a simple and durable mixing device which can be installed in the sprinkler end of an ordinary garden hose or pipe, and which will dissolve a predetermined amount of vitamin or other desired substance in the water stream for spraying on the plants.

Vitamins are quite generally sold in tablet form, and the device of our invention is particularly designed to accommodate a number of these tablets at once, and to operate for a considerable length of time, thus allowing the treatment of relatively large areas without refilling the mixer.

These and other objects and advantages of our invention will become apparent from the following description of a preferred and modified form thereof, and from the accompanying drawings, in which:

Fig. 1 is a side elevational perspective of our preferred form of mixing device showing the cap and cylinder about to be assembled;

Fig. 2 is a side elevation partially in section of the device of Fig. 1 assembled in a conventional garden hose;

Fig. 3 is a front perspective of said device;

Fig. 4 is a front elevation of the same;

Fig. 5 is a side elevation of a modified form of mixing device;

Fig. 6 is a perspective of the plug shown in Fig. 5;

Fig. 7 is a side elevational perspective of said modified form;

Fig. 8 is an end view taken at 8—8 in Fig. 5; and

Fig. 9 is another perspective from a different angle of the device of Fig. 5.

Referring now to the drawings, and particularly to Figs. 1-4 thereof, the numeral 10 indicates a cylindrical housing or tube which is preferably closed at one end, and open at the other. The closed end is provided with a small opening or port 11, preferably at its center, while a second opening or port 12 is provided in the wall of the tube 10 adjacent the open end thereof.

The numeral 13 indicates generally a head member or cap which comprises a central conical shell 14 terminating in an annular flange 15 at one end, and a plug 16 at the other. The plug 16 is adapted to fit snugly in the open end of tube 10 to hold the cap and tube together so that it can function as a unit. The conical shell 14 of head 13 is provided with a pair of longitudinal apertures or slots 17 to effect communication between the inside and outside of said head, and allow the passage of liquid therethrough.

In assembling our invention for use in a hose, the tube 10 is first filled with tablets (vitamin concentrate, for example) which have an outer diameter slightly less than the inner diameter of the tube, so as to permit the flow of fluid through the tube and around the tablets. The cap 13 is then attached to the tube by inserting the plug 16 into the open end of the tube, and the whole unit is inserted in the open end of the hose 18 with which it is to be used. The flange 15 is of such size that it rests against the outer end of the hose 18 and is held thereagainst by the nozzle 19 when it is screwed on in conventional manner.

It will thus be seen that the tube 10 is held in the center of the hose 18 so that a stream of water flowing therein will flow around and past the tube and through the apertures 17 to the nozzle 19. The ports 11 and 12 are of just the right size to divert sufficient water into the tube 10 to dissolve the correct amount of material from the tablets 20 and then to permit said solution to flow into and mix with the stream flowing past the tube and out of the nozzle. By properly correlating the size, potency and hardness of the tablets with the size of the holes 11 and 12, and with the size of the hose 18, a correctly predetermined amount of vitamin is furnished with a given quantity of water passing through the nozzle 19.

Referring now to Figs 5-9, wherein we have illustrated a modified form of our device, it is seen that the numeral 30 indicates a tube preferably open at both ends and provided with a plug 31 at its rear end. A head 33 is formed by flaring the end of the tube 30 outwardly to form a conical shell 34 provided with a pair of longitudinal apertures or slots 37 and an annular flange 35. A polygonal (preferably hexagonal) plug 36 is wedged in the neck of the tube 10 just inside of the point where it begins to flare outwardly to form the conical shell 34. There is of course a small space between each of the faces of the polygonal plug and the interior of the tube 10, and it is these spaces which permit circulation of fluid into and out of the tube to dissolve the tablets.

This form of our invention is assembled in much the same manner as is our preferred form, with the tube 30 held in spaced relationship inside of the hose by reason of the flange 35 being clamped between the end of the hose and the nozzle. In this case, however, there is no fluid passing directly through the tube, but instead, the back pressure generated in the chamber of the conical shell 34 forces a predetermined amount of water back around the plug and into the tube to dissolve the tablets therein. Due to the turbulence of the water a constant circulation of fresh water into the tube and vitamin solution out of the tube is maintained so that the main stream of water discharged from the nozzle has just the correct amount of vitamin concentrate dissolved therein.

As will be apparent, the tablets are inserted into the tube 10 by removing the plug 31, which is again screwed in place after the tube has been filled. In this form of our invention, as in the preferred form, the tablets must of course be correlated with the aperture and nozzle sizes so as to give the correct proportions of vitamin per unit of water supplied.

Various materials may be used in the manufacture of our mixing device, but we have found that a molded plastic serves best and is the most economical and efficient in the long run, although suitable metals such as aluminum, cast iron, or brass may be used. It will also be understood that where we use the word hose, we mean to include pipe.

While the forms of our invention herein described in detail are fully capable of accomplishing the objects and providing the advantages stated, it is to be understood that they are merely illustrative of the broad concept of our invention as defined by the appended claims.

We claim as our invention:

1. A mixing device of the character described which includes: a tube adapted to hold a quantity of solid material to be dissolved, said tube being provided with inlet and outlet ports; and a head comprising an apertured conical shell with a flange on its outer end adapted to be engaged by a hose coupling to thereby hold said tube in said hose, whereby a portion of the liquid flowing in said hose will be diverted into said tube to dissolve some of said solid material and then flow back into the main stream of said liquid.

2. A mixing device of the character described which includes: a tube adapted to hold a quantity of solid material to be dissolved, said tube being provided with an inlet port in one end thereof, and an outlet port adjacent the other end thereof; and a head comprising an apertured conical shell with a flange on its outer end adapted to be engaged by a hose coupling to thereby hold said tubes in said hose, whereby a portion of the liquid flowing in said hose will be diverted into said tube to dissolve some of said solid material and then flow back into the main stream of said liquid.

3. A mixing device of the character described which includes: a cylindrical tube adapted to hold a quantity of solid material to be dissolved, said tube being provided with a polygonal plug disposed in the outlet end of said tube permitting circulation of fluid into and out of said tube; and a head comprising an apertured conical shell with a flange on its outer end adapted to be engaged by a hose coupling to thereby hold said tube in said hose, whereby a portion of the liquid flowing in said hose will be diverted into said tube to dissolve some of said solid material and then flow back into the main stream of said liquid.

4. A mixing device of the character described which includes: a cylindrical tube closed at one end and adapted to hold a plurality of tablets, said tube being provided with an inlet port in its closed end, and an outlet port in one wall adjacent its open end; a removable head comprising an apertured cylindrical shell having a plug on one end adapted to fit in the open end of said tube, and a flange on the other end adapted to be clamped between the end of a hose and a nozzle to hold said tube within said hose and in spaced relation to the walls thereof.

5. A mixing device of the character described which includes: a cylindrical tube open at both ends and adapted to hold a plurality of tablets; a removable plug adapted to close one end of said tube; a conical head on the other end of said tube provided with apertures in its side and an annular flange at its outer end; and a polygonal plug disposed in the open end of said tube adjacent said conical shell, permitting circulation of liquid into and out of said tube whereby the back pressure of liquid flowing through said shell will cause circulation of some of said liquid in and out of said tube.

6. The combination with a hose and nozzle, of a mixer comprising a tube adapted to hold a plurality of tablets, said tube being provided with inlet and outlet means, and an apertured head having a flange adapted to be clamped between said hose and nozzle whereby said tube is supported in said hose out of contact with the walls thereof so that a portion of the liquid flowing in said hose is diverted into said tube and then allowed to return to the main stream of said liquid.

7. A mixing device of the character described, which includes: a tube adapted to hold a plurality of tablets to be dissolved, said tube being provided with restricted aperture means permitting circulation of liquid therethrough; and a head on one end of said tube provided with a flange adapted to be engaged by a hose coupling to position said tube longitudinally in said hose, said head being provided with at least one major aperture permitting relatively free flow of liquid from said hose through said head.

8. A mixing device of the character described, which includes: a tube adapted to hold a plurality of tablets to be dissolved, said tube being provided with restricted aperture means permitting circulation of liquid therethrough; and a conical head on one end of said tube provided with a flange adapted to be engaged by a hose coupling to position said tube longitudinally in said hose, said head being provided with at least one major aperture permitting relatively free flow of liquid from said hose through said head.

9. A mixing device of the character described, which includes: a tube adapted to hold a plurality of tablets to be dissolved, said tube being provided with restricted aperture means permitting circulation of liquid therethrough; and a head on one end of said tube provided with a flange adapted to be engaged by a hose coupling to position said tube longitudinally in said hose, said head being provided with a plurality of apertures permitting relatively free flow of liquid from said hose through said head.

10. A mixing device of the character described, which includes: a cylindrical tube adapted to hold a plurality of tablets to be dissolved, said tube being provided with a polygonal plug in the outlet end thereof permitting circulation of fluid into and out of said tube; and an apertured head on said tube adapted to hold the same longitudinally in a hose whereby liquid can flow around said tube and into the same.

E. C. ARMSTRONG.
ROBERT R. LOKEY, Jr.